2,895,949

COPYMERS OF ACRYLONITRILE

Walter M. Thomas, Springdale, Conn., assignor to American Cyanamid Company, New York, N.Y., a corporation of Maine No Drawing. Application August 20, 1953
Serial No. 375,576

13 Claims. (Cl. 260—80.5)

This invention relates to the production of new synthetic materials having valuable and characteristic properties, and more particularly is concerned with polymerized acrylonitrile compositions and specifically copolymers of acrylonitrile. The scope of the invention includes compositions comprising a ternary polymer of a mixture of comonomers consisting of, by weight, from 2 to 15% of an acrylamide represented by the formula

I

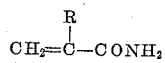

$$CH_2=C-CONH_2$$

where R represents a member of the class consisting of hydrogen and the methyl radical, from 1.5 to 15% of at least one (e.g., two, three, four or any desired number) alkyl vinylpyridine represented by the formula

II

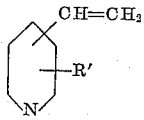

where R' represents a radical of the class consisting of methyl and ethyl radicals, and the remainder acrylonitrile.

The suggestion was made prior to my invention that various acrylonitrile copolymer compositions could be prepared by polymerizing acrylonitrile either alone or admixed with various other monomers which are copolymerizable therewith, including such monomers as methyl methacrylate and other esters of methacrylic acid, esters of acrylic and alpha-chloroacrylic acids, vinyl chloride, acrylamide, vinyl acetate and 2-vinylpyridine. For example, in Arnold Patent No. 2,456,360 there is disclosed and claimed a process of polymerizing an acrylonitrile composition wherein the polymerizable portion is substantially entirely monoethylenically unsaturated and is at least 90% acrylonitrile, the remainder being such monomers as have just been mentioned, and the process itself involving carrying out the polymerization reaction in the presence of from 0.01 to 2%, by weight of the polymerizable components, of dithioglycidol. Also, Arnold Patent No. 2,491,471 discloses and claims copolymers containing from 2 to 10% recurring vinylpyridine units, the remainder of the copolymer consisting of acrylonitrile units.

While the copolymers of the prior art described above have had many useful applications, for instance in the production of synthetic fibers, there have been many instances where such copolymers did not have the necessary solubility, dyeability and spinnability to meet the particular requirements encountered in a particular application or method of producing the shaped article therefrom.

The present invention has, as one of its main objects, the production of new acrylonitrile copolymer compositions which are more readily capable of being both fabricated (e.g., in fiber or other form) and dyed, especially with acid dyes, than homopolymeric acrylonitrile and copolymers of acrylonitrile such as those suggested in the prior art.

Another object of the invention is to prepare such copolymers which can be converted readily into fabricated articles, e.g., textile materials including oriented fibers of fiber-forming polymeric material comprising a ternary polymer of the kind described above; and the fabricated article then dyed, advantageously with an acid dye.

Still another object of the invention is to prepare readily dyeable copolymers which can be dissolved in suitable solvents, e.g., dimethyl formamide, and the resulting spinning solution then either wet- or dry-spun to yield an oriented fiber that subsequently can be dyed, if desired, with an acid or other dyestuff.

Another object of the invention is to produce dyeable copolymers that can be wet- or dry-spun and the resulting fiber oriented to a high degree, as by stretching, to form an oriented fiber which is readily receptive to acid and other dyestuffs, without detracting in any way from the other useful properties of the material.

Other objects of the invention will be apparent to those skilled in the art from the description and examples which follow.

These objects are accomplished, in general, by preparing a copolymer, more particularly a ternary polymer, of acrylonitrile, acrylamide or methacrylamide or a mixture thereof in any proportions, and at least one alkyl vinylpyridine of the kind embraced by Formula II, using the following proportions of these comonomers: from 2 to 15%, advantageously from 2 to 10%, of acrylamide, methacrylamide or a mixture thereof; from 1.5 to 15%, advantageously from 2 to 10%, of a methyl vinylpyridine or an ethyl vinylpyridine (or a mixture thereof in any proportions), and still more particularly methyl vinylpyridine consisting mainly of 2-methyl-5-vinylpyridine or ethyl vinylpyridine consisting mainly of 2-vinyl-5-ethylpyridine; and the remainder acrylo nitrile. Still more particularly, the objects of the invention are accomplished by preparing a dyeable, fiber-formable, dimethylformamide soluble polyacrylonitrile composition wherein the sole acrylonitrile polymer is a ternary polymer of a particular mixture of comonomers. This mixture consists of, by weight, from 2 to 8% of acrylamide or methacrylamide, from 2.5 to 5.0% of at least one alkyl vinylpyridine represented by the formula

where R' represents a methyl radical or an ethyl radical, while the remainder of the mixture is acrylonitrile.

Various methods can be employed to prepare the ternary polymers of this invention, more particularly ternary polymers of particular proportions of a methyl or an ethyl vinylpyridine (including acid-addition salts thereof), acrylamide or methacrylamide or a mixture thereof, and acrylonitrile. Heat, light, or both heat and light, with or without a polymerization catalyst, can be used. A polymerization catalyst preferably is employed in order to shorten the period of time required for polymerization of the mixture of monomers. Any of the polymerization catalysts which are suitable for use in polymerizing compounds containing an ethylenically unsaturated grouping, specifically a vinyl grouping, can be employed. Among such catalysts are the various organic peroxy catalysts, illustrative examples of which latter are: the dialkyl peroxides, e.g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide, such peroxides often being designated as ethyl, propyl, butyl, lauryl, oleyl, stearyl, tert.-butyl and tert.-amyl peroxides; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic per-compounds, examples of which are given hereinafter. Other so-called "free radical" types of catalysts, e.g., α,α'-azodiisobutyronitrile, also can be used to accelerate polymerization. The various known "redox" (reduction-oxidation) catalyst systems also can be employed, and are especially adapted for use when the mixed monomers are copolymerized in an aqueous medium. Such water-soluble catalyst systems generally comprise a water-soluble catalyst or catalysts and a water-soluble activator. Illustrative examples of water-soluble catalysts are water-soluble, oxygen-yielding peroxy compounds, e.g., the water-soluble peroxides, peracids and persalts, including hydrogen peroxide, organic peroxides, e.g., diacetyl peroxide, urea peroxide, etc., peracetic acid, the various water-soluble perchlorates, persulfates, percarbonates, perborates, perphosphates, etc., e.g., the ammonium and alkali-metal (sodium, potassium, lithium, etc.) salts of percarbonic, peracetic, perboric, perphosphoric, persulfuric, perchloric, etc., acids; and water-soluble ferric salts capable of yielding ferric ions, including the various ferric alums, e.g., ferric ammonium sulfate (ferric ammonium alum), ferric sodium sulfate, ferric potassium sulfate, etc. Other examples of water-soluble additives comprising a water-soluble catalyst that may be used in producing the copolymers of the present invention are given in, for instance, U.S. Patents 2,289,-540, 2,380,474–5,–6,–7, 2,380,617–8, 2,380,710 2,383,425, 2,384,544, 2,384,571, 2,384,574, 2,388,373 and 2,395,017.

Illustrative examples of water-soluble activators (water-soluble polymerization adjuvants) of the catalyst are oxygen-containing sulfur compounds which are capable of undergoing oxidation, for instance sulfur dioxide, the alkali-metal (e.g., sodium, potassium, etc.) bisulfites, hydrosulfites, thiosulfates, sulfurous acid (or compounds which engender sulfurous acid, e.g., alkali-metal sulfites, ethyl and other alkyl sulfites, etc.), various organic sulfinic acids, e.g., p-toluene sulfinic acid, formamidine sulfinic acid, etc. If alkali-metal sulfites, e.g., sodium sulfite, or similar compounds which engender sulfurous acid are used, the aqueous solution also should contain a strong acid, e.g., sulfuric acid, etc., in an amount which is at least chemically equivalent to the amount of such a compound engendering sulfurous acid that is employed.

If desired, the mixture of monomers can be polymerized in emulsion or in solution state to yield a copolymer. Good results are obtained by effecting copolymerization while the monomers are dissolved in a suitable solvent, preferably water or a liquid solvent comprising mainly water. Suitable inert organic solvents also can be used if desired, e.g., benzene, toluene, xylene, etc. Preferably the copolymerization reaction is carried out in a liquid medium in which the monomeric mixture is soluble but the copolymer is insoluble, e.g., water.

The polymerization also can be effected by conventional bulk polymerization technique, in the presence or absence of a solvent capable of dissolving the monomeric mixture and in which the latter preferably is inert; or by conventional bead polymerization methods. The polymerization of the mixture of monomers can be effected by a continuous process as well as by a batch operation.

The concentration of the catalyst is relatively small, e.g., from, by weight, about 1 part of catalyst per 1000 parts of the monomeric mixture to about 4 or 5 parts of catalyst per 100 parts of the mixture of monomers. The amount of polymerization adjuvant or activator used likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e.g., 2 or 3 or more moles of activator per mole of catalyst, or correspondingly larger proportions on a chemical equivalent basis, but no particular advantages ordinarily accrue therefrom.

The polymerization (copolymerization) reaction may be effected, if desired, while the aqueous medium is maintained under an atmosphere of an inert gas, for example nitrogen, helium, carbon dioxide, etc.; or, it may be (but preferably is not) carried out under an atmosphere of air.

The temperature at which the monomers are copolymerized can be varied over a wide range, up to and including or slightly above the boiling point (at atmospheric pressure) of the monomeric mixture. In most cases, the polymerization temperature will be within the range of about 20° to 30° C., preferably at least 35° or 40° C., up to the boiling temperature of the mixture of monomers, depending, for example, upon the particular catalyst, if any, used, the rapidity of polymerization wanted and other influencing factors. The use of polymerization temperatures substantially above the boiling point of the mixture of monomers is not precluded, but generally is less desirable because the polymerization reaction then must either be carried out in a closed reaction vessel under pressure, or, for economical reasons, with a reflux condenser or other means provided for the recovery and reuse of the volatilized monomer or monomers if the reaction is carried out at the boiling temperature of the mass under atmospheric pressure.

If desired, the monomers may be copolymerized in the presence of a plasticizer for the copolymer. Other copolymerization methods, however, also may be employed, e.g., methods such as those described in U.S. Patents 2,140,048, 2,160,054, 2,194,354, 2,333,635, 2,436,926, and British Patent 586,881 with reference to the production of other polymerization products. The acrylonitrile copolymers, specifically acrylonitrile ternary polymers, of this invention, can be produced in various molecular weights, depending, for instance, upon the particular polymerization conditions employed, but ordinarily are within the range of about 15,000 to about 300,000 or higher as calculated from viscosity measurements using the Staudinger equation (reference: U.S. Patent No. 2,404,713). Homogeneous copolymers having an average molecular weight of between from 60,000 and 90,000 and which contain at least 80%, preferably from 85 or 90% to 96.5%, of acrylonitrile (combined acrylonitrile) in the molecule, are especially suitable for use in making dyeable, oriented fibers by wet- or dry-spinning methods.

If the copolymerization reaction is carried out while the mixed monomers are dissolved or dispersed in a liquid medium, e.g., in solution in water, the resulting copolymer then is separated from the said medium by any suitable means, e.g., by filtration, centrifuging, solvent extraction, etc.

In order that those skilled in the art may better understand how the present invention can be carried into effect, the following examples are given by way of illustration and not by way of limitation. All parts and percentages are by weight.

*Example 1*

This example illustrates the preparation of a ternary polymer of a plurality of comonomers consisting of (as present in the polymerizable mixture) about 5% acrylamide, about 5% methyl vinylpyridine consisting mainly of 2-methyl-5-vinylpyridine, and the remainder acrylonitrile.

The copolymerization is effected continuously, using apparatus which includes a reaction vessel that is provided with an overflow tube located at the top of the reaction vessel. Agitation is effected primarily by circulating the contents of the reaction vessel continuously through a high-speed centrifugal pump. Additional agitation in the reaction vessel is effected by means of a motor-driven propeller. The temperature is regulated by means of a heat-exchanger located in the circulating system. The solutions of monomeric material and of catalyst, hereafter described, are fed into the reaction vessel using variable-speed pumps.

The reactor is charged with a previously prepared aqueous slurry (e.g., a 35% aqueous slurry) of an acrylonitrile polymerization product (polymer or copolymer), more particularly (and for purpose of illustration and not by way of limitation) a two-component copolymer of about 95% acrylonitrile and 5% methyl acrylate. The following solutions are then fed in at such a rate that the stated quantities are delivered each hour.

Feed 1:

|  | Parts |
|---|---|
| Sodium chlorate | 3.8 |
| Sodium sulfite | 13.4 |
| Demineralized water | 1050.0 |

Feed 2:

| Methyl vinylpyridine consisting mainly of 2-methyl-5-vinylpyridine | 43.0 |
|---|---|
| Acrylamide | 43.0 |
| Acrylonitrile | 775.0 |

Feed 3:

| Sulfuric acid | 28.30 |
|---|---|
| Ferrous sulfate | 0.0225 |
| Demineralized water | 1050.00 |

The temperature of the slurry is maintained at 40° C., and the copolymerization reaction is stopped at the end of 5 hours.

The tenary polymer is isolated from the final reactor slurry by centrifuging, washed in the centrifuge with 40,000 parts of demineralized water, and dried in an oven at 70° C. for about 16 hours. A dry, white, dimethylformamide-soluble ternary polymer is obtained. Analysis of a sample shows that it contains about 4.0% of units derived from acrylamide, about 3.3% of units derived from methyl vinylpyridine (mainly 2-methyl-5-vinylpyridine), and the remainder units derived from acrylonitrile.

Instead of charging an aqueous slurry containing about 35% of a previously prepared copolymer of about 95% acrylonitrile and 5% methyl acrylate to the reactor, one can use a slurry containing any other suitable concentration of the previously prepared acrylonitrile polymerization product (e.g., from 5 or 10% to 35 or 40% by weight of the slurry). One can use an aqueous slurry containing, for example, a previously prepared homopolymer of acrylonitrile, or of a copolymer (dipolymer, tripolymer, tetrapolymer, etc.) different from the aforementioned acrylonitrile-methyl acrylate copolymer thereby to obtain a blend of the acrylonitrile polymerization product contained in the previously prepared slurry and of the ternary polymer with which this invention is concerned. When this practice is followed, the concentration of the initially prepared acrylonitrile polymerization product in the slurry decreases as the continuous polymerization proceeds. When one desires the final product to be composed solely of the ternary polymer of this invention, then one charges to the reactor an aqueous slurry containing a suitable concentration of a previously prepared ternary polymer of the invention. The polymerization reaction advantageously is carried out at a pH not higher than 6, e.g., from 2.5 to 5.9, and preferably from 3.5 or 4 to 5.9.

The foregoing polymerization technique has numerous advantages over the prior-art practices, including the advantages of providing higher overall yields of the ternary polymer; better control of the reaction; the more ready production of acrylonitrile-acrylamide-methyl (or ethyl) vinylpyridine ternary polymers having a specific, predetermined average molecular weight (this latter being particularly important when the ternary polymers are to be formed or fabricated into fibers); the obtainment of a more homogeneous polymeric product (that is, one which contains minimum amounts of polymer having a molecular weight outside the lower and higher limits of molecular weight wanted in the product); as well as others. This polymerization method for producing the ternary polymers of this invention is, to the best of my knowledge and belief, new and novel.

*Example 2*

Essentially the same procedure is followed as described under Example 1 with the exception that 21.5 parts of the methyl vinylpyridine comonomer is used instead of 43 parts; 64.5 parts of acrylamide instead of 43 parts; and, in Feed 3, 19.5 parts of sulfuric acid instead of 28.3 parts. The resulting ternary polymer is employed in making comparative dye tests and for forming into fibers as described in examples which follow.

*Example 3*

Example 1 is repeated substituting an equivalent amount (molar basis) of 2-vinylpyridine for the methyl vinylpyridine (mainly 2-methyl-5-vinylpyridine) of that example. The resulting ternary polymer of acrylonitrile, acrylamide and 2-vinylpyridine is employed in making comparative tests described in examples which follow.

*Example 4*

A two-liter, three-neck reaction vessel equipped with a thermometer, condenser, dropping funnels and agitator is supported on a water bath maintained at 35° C. To the vessel are added 800 ml. of deionized water and 8 ml. of 6 N sulfuric acid, and nitrogen is passed through the vessel to remove dissolved oxygen. After 15 minutes the following monomers in the specified amounts are added:

|  | Grams |
|---|---|
| Methyl vinylpyridine consisting mainly of 2-methyl-5-vinylpyridine | 2.0 |
| Acrylamide | 8.0 |
| Acrylonitrile (dry basis) | 90.0 |

Into the first dropping funnel is placed a solution of 3.42 grams of ammonium persulfate dissolved in 100 ml. of deionized water, and into the second funnel is placed 0.71 gram of sodium meta-bisulfite also dissolved in 100 ml. of water. Catalyst solutions are added from the dropping funnels as follows:

| 0 min. | 40 ml. each |
|---|---|
| 25 min. | 15 ml. each |
| 50 min. | 15 ml. each |
| 75 min. | 10 ml. each |
| 100 min. | 10 ml. each |
| 125 min. | 5 ml. each |
| 150 min. | 5 ml. each |

After a total reaction time of 5 hours at 35° C. the slurry is filtered, washed with 2 liters of water, and dried for about 16 hours at 70° C. The yield of white, granular, ternary polymer of acrylonitrile, acrylamide and methyl vinylpyridine consisting mainly of 2-methyl-5-vinylpyridine is 91 grams. sample of this polymer is employed in the dye tests described hereinafter.

*Example 5*

Samples of homopolymeric acrylonitrile and of the ternary polymers of Examples 1, 2, 3 and 4 are subjected to the following dye test:

A sample (10 parts) of the dry homopolymer or ternary polymer is added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The homopolymeric acrylonitrile fails to absorb any dye.

The ternary polymers of Examples 2 and 3 are dyed to about the same intensity of blue, which shows conclusively that 2-vinylpyridine and a methyl vinylpyridine, specifically a methyl vinylpyridine consisting mainly of 2-methyl-5-vinylpyridine, are not the equivalents of each other in this relationship, that is, in forming a ternary polymer thereof with particular proportions of acrylonitrile and acrylamide. This non-equivalency is readily apparent when it is considered that it is necessary to introduce into the ternary polymer only about one-half as much methyl vinylpyridine as 2-vinylpyridine in order to produce a polymer which can be dyed to substantially the same depth of color. This is a difference of substance and not merely of degree, in no way could have been predicted, and is a matter of tremendous practical and economic importance as will be readily apparent to those skilled in the art. Furthermore, these results are obtained without detrimentally affecting the other useful properties, particularly fiber-forming characteristics, of the ternary polymers of this invention; and this likewise in no way could have been predicted from the known properties of the respective monomers or from the properties of the prior-art polymerization products prepared from the respective monomers.

The ternary polymer of Example 1 is dyed to a much greater depth of blue than the ternary polymer of Examples 2 and 3. The color comparisons between the ternary polymers of Examples 1 and 3 again show the non-equivalency of an unsubstituted vinylpyridine, specifically 2-vinylpyridine, and a vinylpyridine having a methyl group substituted in the heterocyclic nucleus, when the respective monomers are employed in the particular relationship with which this invention is concerned, that is, in making ternary polymers thereof with particular proportions of acrylonitrile and acrylamide.

*Example 6*

Twenty (20) parts of the ternary polymer of Example 1 is slurried by rapid stirring at room temperature in 80 parts of dimethyl formamide. While protected by a blanket of carbon dioxide the temperature of the mixture is raised to 80° C. with slow stirring until all of the copolymer has dissolved to form a clear, viscous solution.

After deaeration and filtration the warm solution is extruded downwardly through a spinneret having 40 holes, each 70 microns in diameter, into a spinning cell, the inner wall of which is maintained at a temperature of approximately 425° C. by means of a fluid heating medium which circulates around the outer wall of the cell. A current of preheated gas at 125° C. is introduced at the bottom of the cell and passes upwardly countercurrent to the filaments which pass downwardly from the spinneret. By this means the major proportion of the dimethyl formamide is evaporated from the filaments by the time the filaments have reached the bottom of the cell.

From the bottom of the cell the group of filaments or thread is led through water to remove the last of the dimethyl formamide solvent, after which it is continuously dried by passing it over a pair of heated drying rolls. The dry multifilament thread is then thermoplastically stretched by conducting it through a slot which is maintained at 400° C. and thence to stretch rolls. Stretch is applied to the thread by having the surface speed of the rolls on the delivery end of the heated slot 8 times that of the surface speed of the rolls which feed the thread to the slot. The filaments are oriented along the fiber axis by this stretching operation.

The thermoplastically stretched thread is more lustrous than that of the unstretched thread. To remove residual strains or shrinkage, the thread is conducted through a second, heated slot at 400° C. and thence to a pair of rolls, the surface speed of which is adjusted to permit about 15% shrinkage of the thread in the slot. After this thermoplastic treatment the thread is collected on a ring-twister bobbin.

The finished thread is tested for its dyeability, in comparison with threads similarly prepared from homopolymeric acrylonitrile and from the ternary polymers of Examples 2 and 3, following essentially the same dye-test method described under Example 5.

The fibers or threads made from the ternary polymers of Examples 2 and 3 are dyed to about the same intensity of blue, even though the former contains only about half as much combined methyl vinylpyridine as the latter contains combined 2-vinylpyridine; those made from the ternary polymer of Example 1 are more deeply dyed than those just described; while those made from homopolymeric acrylonitrile are substantially undyed.

*Example 7*

To a reaction vessel fitted with a condenser are added the following:

| | Parts |
|---|---|
| Methyl ethyl ketone | 90.0 |
| Acrylonitrile (dry) | 90.0 |
| Methacrylamide | 5.0 |
| Ethyl vinylpyridine consisting mainly of 2-vinyl-5-ethylpyridine | 5.0 |
| Azobisisobutyronitrile (polymerization catalyst) | 1.0 |

The vessel is heated on a steam bath, and after a reaction time of 3 hours the resulting slurry is allowed to stand for about 16 hours. Thereafter an additional 1 part of the azo catalyst is added, and the reaction mass is heated under reflux for another 3 hours. The ternary polymer of acrylonitrile, methacrylamide and ethyl vinylpyridine consisting mainly of 2-vinyl-5-ethylpyridine is separated by filtration and dried. It is more readily dyed with, for example, an acid dye than is homopolymeric acrylonitrile or a similarly prepared ternary polymer of acrylonitrile, methacrylamide and 2-vinylpyridine.

Instead of methyl vinylpyridine consisting mainly (more than 50% and more particularly about 75 to 85%) of 2-methyl-5-vinylpyridine (3-vinyl-6-methylpyridine) or ethyl vinylpyridine consisting mainly (more than 50% and more particularly about 75 to 85%) of 2-vinyl-5-ethylpyridine, which were employed in certain of the foregoing examples, one can use 2-methyl-5-vinylpyridine or 2-vinyl-5-ethylpyridine which is composed substantially completely of the single isomer; or one can employ other isomers of methyl vinylpyridine or ethyl vinylpyridine including:

2-methyl-3-vinylpyridine (5-vinyl-6-methylpyridine)
2-ethyl-3-vinylpyridine (5-vinyl-6-ethylpyridine)
3-vinyl-4-methylpyridine (4-methyl-5-vinylpyridine)
3-vinyl-4-ethylpyridine (4-ethyl-5-vinylpyridine)
3-vinyl-5-methylpyridine (3-methyl-5-vinylpyridine)
3-vinyl-5-ethylpyridine (3-ethyl-5-vinylpyridine)
2-vinyl-3-methylpyridine
2-vinyl-3-ethylpyridine
2-vinyl-4-methylpyridine
2-vinyl-4-ethylpyridine
2-vinyl-5-methylpyridine
2-vinyl-5-ethylpyridine
2-vinyl-6-methylpyridine
2-vinyl-6-ethylpyridine
2-methyl-4-vinylpyridine
2-ethyl-4-vinylpyridine
3-methyl-4-vinylpyridine
3-ethyl-4-vinylpyridine as well as mixtures of any or all of the foregoing isomers of methyl vinylpyridine (including 2-methyl-5-vinylpyridine) and/or isomers of ethyl vinylpyridine (including -2-vinyl-5-ethylpyridine) in any proportions.

The ternary polymers of this invention and shaped articles produced therefrom, e.g., mono- and multifilaments, are particularly amenable to dyeing by the process described and claimed in the copending application of Jerry M. Mecco, Serial No. 248,667, filed September 27, 1951, and wherein are given examples of many classes and species of acid and other dyestuffs with which my new polymers can be readily dyed to deep shades. Dyestuffs disclosed in said Mecco application, and employed in the processes therein disclosed and claimed, are useful for dyeing my ternary polymers and structures fabricated therefrom.

Although the new copolymers of this invention are particularly useful in the formation of fibers or filaments having improved properties over that provided by homopolymeric acrylonitrile and the previously known copolymers of acrylonitrile, they also have numerous other applications in the plastics and coating arts. For instance, with or without a filler or other additive, they may be used as molding compositions (or as components of molding compositions) from which molded articles are produced by molding the compositions under heat and pressure, e.g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions can be used in the production of castings of any desired shape or size; as adhesives; in the treatment of paper or paper stock; in coating compositions; and for various other purposes. The ternary polymer can be formed in situ after application of the monomeric mixture to the base material to be coated, impregnated or otherwise treated.

The undyed or dyed shaped articles, more particularly fibers or threads, produced from the ternary polymers of this invention can be fabricated into clothing, blankets, and a wide variety of other textile materials in accordance with conventional practice.

I claim:

1. A dyeable, fiber-formable, dimethylformamide soluble polyacrylonitrile composition wherein the sole acrylonitrile polymer is a ternary polymer of a mixture of comonomers consisting of by weight, from 2 to 8% of a member of the class consisting of acrylamide and methacrylamide, from 2.5 to 5.0% of at least one alkyl vinylpyridine represented by the formula

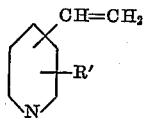

where R' represents a member of the class consisting of methyl and ethyl radicals, and the remainder acrylonitrile.

2. A composition as in claim 1 wherein the alkyl vinylpyridine is a methyl vinylpyridine.

3. A composition as in claim 2 wherein the methyl vinylpyridine includes 2-methyl-5-vinylpyridine.

4. A composition as in claim 1 wherein the alkyl vinylpyridine is an ethyl vinylpyridine.

5. A composition as in claim 4 wherein the ethyl vinylpyridine includes 2-vinyl-5-ethylpyridine.

6. A composition as in claim 1 wherein the acrylamide comonomer is the compound having the formula $CH_2=CH-CONH_2$.

7. A composition as in claim 1 wherein the acrylamide comonomer is the compound having the formula

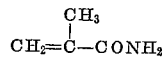

8. A polyacrylonitrile fiber wherein the sole acrylonitrile polymer is a dyeable, fiber-formable, dimethylformamide-soluble ternary polymer of a mixture of comonomers consisting of, by weight, from 5 to 8% of acrylamide, from 2 to 5% of methyl vinylpyridine including 2-methyl-5-vinylpyridine, and the remainder acrylonitrile.

9. A dyeable, fiber-formable, dimethylformamide-soluble, polyacrylonitrile composition wherein the sole acrylonitrile polymer is a ternary polymer of a mixture of comonomers consisting of, by weight, about 8% of acrylamide, about 2% of methyl vinylpyridine including 2-methyl-5-vinylpyridine, and the remainder acrylonitrile.

10. A dyeable, fiber-formable, dimethylformamide-soluble, polyacrylonitrile composition wherein the sole acrylonitrile polymer is a ternary polymer of a mixture of comonomers consisting of, by weight, about 5% of acrylamide, about 5% of methyl vinylpyridine including 2-methyl-5-vinylpyridine, and the remainder acrylonitrile.

11. A dyeable, fiber-formable, dimethylformamide-soluble, polyacrylonitrile composition wherein the sole acrylonitrile polymer is a ternary polymer of a mixture of comonomers consisting of, by weight, about 5% of methacrylamide, about 5% of ethyl vinylpyridine including 2-vinyl-5-ethylpyridine, and the remainder acrylonitrile.

12. A fabricated, oriented, polyacrylonitrile article wherein the sole acrylonitrile polymer is, prior to orientation and fabrication, a dyeable, fiber-formable, dimethylformamide-soluble ternary polymer as defined in claim 1.

13. A textile material including oriented polyacrylonitrile fibers wherein the sole acrylonitrile polymer is a dyeable, fiber-formable, dimethylformamide-soluble ternary polymer as defined in claim 8.

References Cited in the file of this patent

UNITED STATES PATENTS

| 2,456,360 | Arnold | Dec. 14, 1948 |
| 2,491,471 | Arnold | Dec. 20, 1949 |
| 2,657,191 | Coover | Oct. 27, 1953 |
| 2,687,938 | Chaney et al | Aug. 31, 1954 |
| 2,688,008 | Chaney et al. | Aug. 31, 1954 |
| 2,777,832 | Mallison | Jan. 15, 1957 |

FOREIGN PATENTS

| 500,644 | Belgium | July 16, 1951 |

UNITED STATES PATENT OFFICE
CERTIFICATE OF CORRECTION

Patent No. 2,895,949                                                  July 21, 1959

Walter M. Thomas

It is hereby certified that error appears in the printed specification of the above numbered patent requiring correction and that the said Letters Patent should read as corrected below.

Column 2, line 37, for "acrylo nitrile" read -- acrylonitrile --; column 4, line 23, for "20° to 30° C." read -- 20° or 30° C. --; line 52, for "from" read -- about --; column 5, line 39, for "tenary" read -- ternary --; column 6, line 65, before "sample" insert -- A --.

Signed and sealed this 23rd day of February 1960.

(SEAL)
Attest:

KARL H. AXLINE                                                       ROBERT C. WATSON

Attesting Officer                                                Commissioner of Patents